Figure 1:
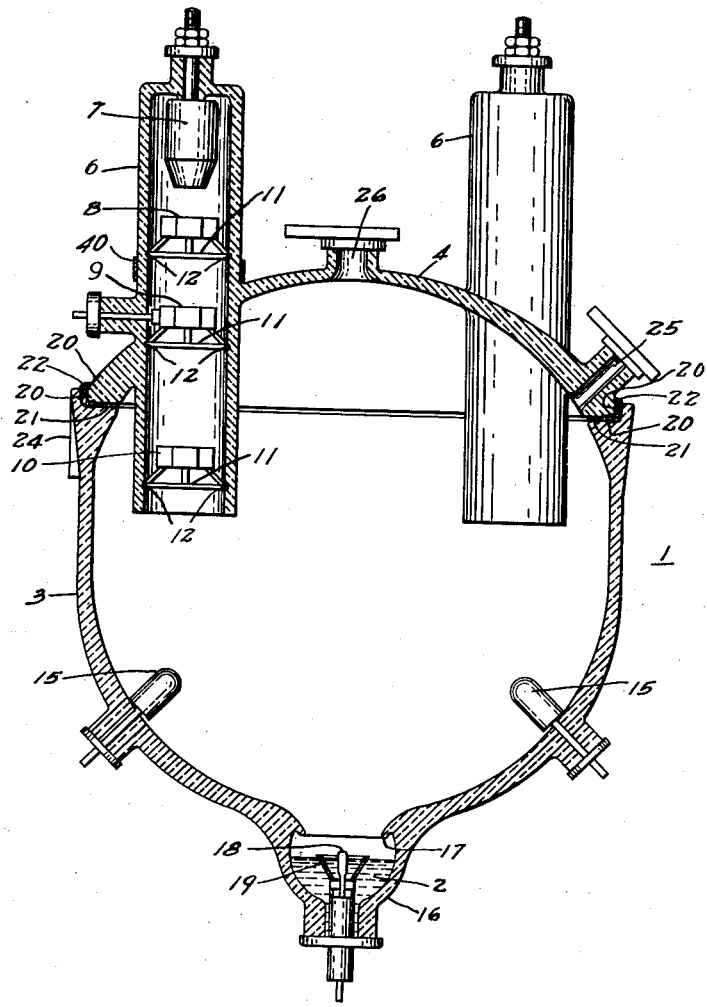

April 11, 1939.  C. KNAPPE ET AL  2,154,274
METAL VAPOR RECTIFIER
Filed Oct. 26, 1936  2 Sheets-Sheet 1

WITNESSES:
Michael Stark
S. A. Strickled

INVENTORS.
Curt Knappe and
Alfred Siemens.
BY
O. B. Buchanan.
ATTORNEY

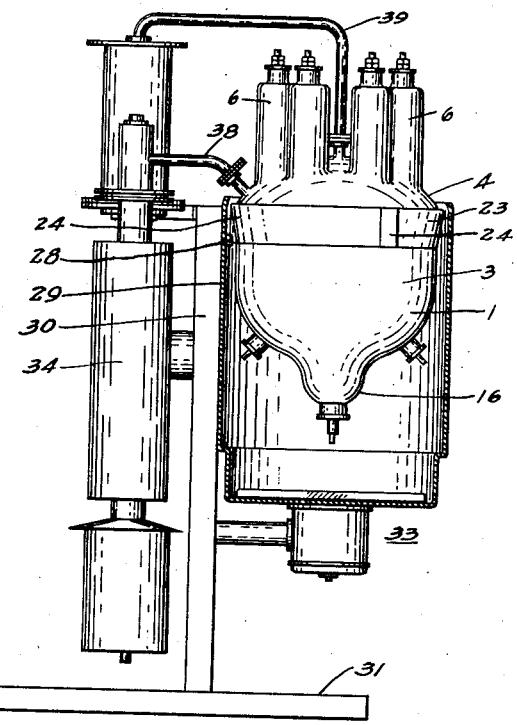
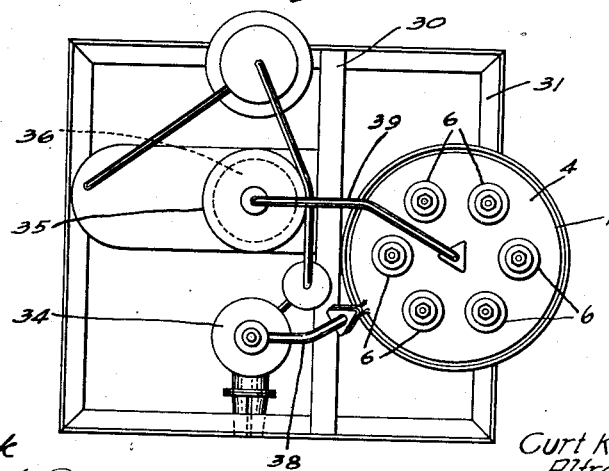

Patented Apr. 11, 1939

2,154,274

UNITED STATES PATENT OFFICE 2,154,274

METAL VAPOR RECTIFIER

Curt Knappe, Berlin-Haselhorst, and Alfred Siemens, Berlin-Grunewald, Germany, assignors to Westinghouse Electric & Manufacturing Company, East Pittsburgh, Pa., a corporation of Pennsylvania Application October 26, 1936, Serial No. 107,694
In Germany October 26, 1935

2 Claims. (Cl. 250—27.5)

Our invention relates to metal vapor rectifiers and particularly to non-metallic containers for such rectifiers.

In the past, it has been customary to provide non-metallic vessels such as glass for vapor electric devices of small capacity. However, it has not been practical to construct non-metallic vessels capable of serving as containers for power type vapor-electric devices such as mercury arc rectifiers.

This has been true for several reasons, particularly the fragile measure of the glass, the expense of constructing glass receptacles of sufficient size and the inherent unsuitability in regard to thermal conditions as sudden heating or cooling is liable to endanger the glass containers.

It is an object of our invention to provide a suitable non-metallic container of suitable ceramic material such as porcelain which can be made of sufficient size for a container for a power rectifier and which is sufficiently rugged to withstand the necessary strains inherent in its use as a rectifier container.

It has been heretofore proposed to construct power type converters of composite metal and porcelain structure. Such devices have been impractical because of the difficulty in securing suitable vacuum tight seals between the component parts of the composite structure. We have avoided this difficulty by constructing the entire container of ceramic material, preferably comprising two parts, a main body portion and a cover portion and soldering the two portions together.

In the preferred embodiment of our construction, the necessary bushings, arc guides and other parts such as supporting blocks, are preferably made of porcelain integral with the main container portion of the device. If desired, all or portions of the device may be covered with a suitable glaze or other surface material both for the purpose of maintaining the necessary vacuum tightness or to assist in controlling the temperature of portions of the container.

While the container may be of any suitable construction, we prefer to construct it of two portions, a main body portion having a receptacle for the cathode and the necessary bushings for the excitation electrodes and a cover portion having integral anode bushings and arc guides, the two portions being provided adjacent their meeting edges with a suitable metalized surface such as a metal glaze and being joined together by either hard or soft solder applied in a band to the adjacent metalized surfaces.

In the preferred construction of a converter according to our invention a ceramic vessel is supported in a suitable frame preferably in the form of a cylinder through which air can be circulated to control the temperature of the inverter chamber.

Figure 4:
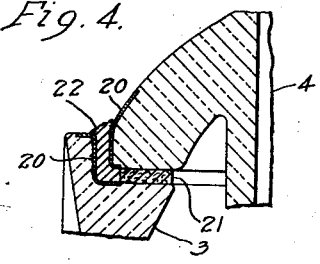

Other objects and advantages will be apparent from the following detailed description taken in conjunction with the accompanying drawings, in which:

Figure 1 shows a transverse cross section through a rectifier according to our invention, Fig. 2 is an elevation of a converter, Fig. 3 is a plan view of a converter according to our invention, and Fig. 4 is a fragmentary sectional view showing details of the solder joint.

In the illustrated embodiment of our invention, the converter vessel 1, preferably of a shape approaching the spherical consists wholly of porcelain, preferably in two parts, the bottom a pot shaped portion 3 which contains the cathode 2 and a cover portion 4 which contains the arc guides 6, in which are supported anodes 7 and suitable deionizing grids 8 and 10 and a control grid 9. The grids 8, 9 and 10 rest on suitable seats and are held in place by any suitable means. We have shown the grids 8, 9 and 10 as being provided with spring rings 11 which engage in grooves or other suitable seats 12 located in the wall 5 of the arc guides.

While the deionizing grids 8 and 10 are maintained at no special potential and function merely to deionize the arc space, the grid 9 is connected by a conductor 13 to a suitable control potential for controlling the operation of the device. The anode 7, as well as the auxiliary electrodes 15 serving for excitation purposes are brought through the porcelain walls in a suitable vacuum tight construction, preferably a metallic glaze is applied to the portion of the container adjacent the conductors and the necessary vacuum tightness assured by soldering the conductor to the surrounding metallic glaze. The cathode container 16 is formed as an integral portion of the porcelain pot 3 which is provided with an inwardly projecting lip or rim 17 which serves the double function of preventing splashing or excessive agitation of the cathode material and of breaking up the flow of condensed mercury returning to the cathode.

A suitable starting electrode 18 is provided adjacent the mercury surface while a suitable spot fixing body 19 projects above the surface of the cathode material. We prefer to provide the pot 3 and the cover 4 with a suitable reinforcing or thickened rim adjacent the points of contact between the pot 3 and the cover 4. This thickened portion may be used as a seat for supporting the pot in a supporting structure or the thickened rim may be provided with suitable lugs 24 for engagement with any desired supporting structure. For joining the pot 3 and the cover 4, a suitable metallic coating is provided adjacent their meeting edges. This coating 20 may consist of platinum, iron or any other substantially pure metal applied to the porcelain in vacuum tight condition.

The joint is made by applying a strip of solder 22 joined to each of the metalized surfaces 20; preferably an asbestos packing 21 is provided between the adjacent edges of the pot 3 and the cover 4 to prevent mercury coming in contact with the metalized surfaces 20 or the soldered joint 22.

We prefer to provide the container with suitable openings 25 and 26 for connection to the vacuum pump, vacuum measuring or other desired implements.

The anodes 7 are preferably supported in arc guides 5 integral with the cover portion 4. These arc guides 5 preferably extend both outside and inside of the cover 4 in order to provide the desired length for controlling the arc.

If desired, certain portions of the container may be provided with a suitable metallic glaze 40 to which a heater or other temperature regulating means may be attached for controlling the internal temperature of the device. In the preferred construction, as shown in Figs. 2 and 3, the ceramic vessel is supported by the lugs 24 on any suitable support 28, preferably enclosed in the cylindrical member 29 which serves as a guide for a suitable ventilating material which is circulated by the blower 33, the whole being supported on a stand 30 having a suitable base plate 31. The stand 30 is also utilized to support a suitable vacuum pump 34 which is connected to one of the openings 25 or 26 by means of a suitable connection 38.

If desired, the auxiliary structures such as the pump 34 may be so distributed about the supporting structure 30 as to counterbalance the weight of the ceramic container 27.

While we have shown and described a specific embodiment of our invention, it will be apparent that many changes and modifications can be made therein without departing from the true spirit of our invention or the scope of the appended claims.

We claim as our invention:

1. A vapor-electric device comprising a pot like porcelain body, said body being substantially thickened adjacent the open end thereof, a porcelain closure member seated on the thickened portion of said body, a vacuum tight solder seal between said body and said closure member, a vaporizable cathode in said body, a plurality of substantially tubular arc guides forming a portion of said cover member, and an anode in each of said arc guides.

2. A vapor-electric device comprising a two part ceramic container, one part of said container having a cathode dish therein, a liquid cathode in said dish, means for retaining said cathode in said dish, a plurality of substantially tubular arc guides forming a portion of the other part of said container, an anode in each of said arc guides, anode leads attached to said anodes and extending through the wall of the respective arc guides and a vacuum proof seal between said anode leads and said container.

CURT KNAPPE.
ALFRED SIEMENS.